(No Model.)
R. ROBB.
METHOD OF ELECTRIC WELDING.
No. 434,468. Patented Aug. 19, 1890.
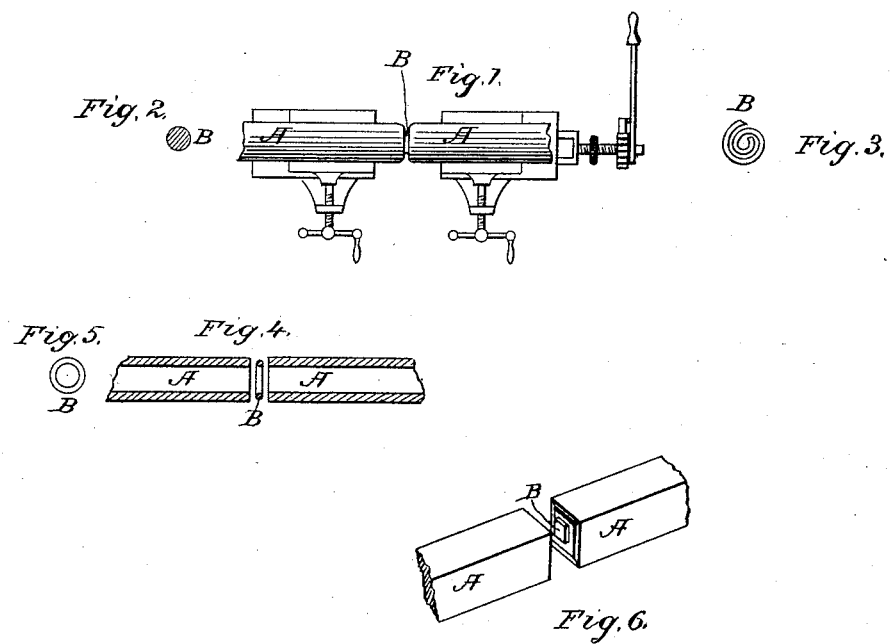
ATTEST:
J. Hurdle
Thos. H. Capel
INVENTOR:
Russell Robb
By H. L. Townsend
Attorney

UNITED STATES PATENT OFFICE.

RUSSELL ROBB, OF BOSTON, MASSACHUSETTS, ASSIGNOR TO THE THOMSON ELECTRIC WELDING COMPANY, OF MAINE.

METHOD OF ELECTRIC WELDING.

SPECIFICATION forming part of Letters Patent No. 434,468, dated August 19, 1890.

Application filed April 9, 1890. Serial No. 347,168. (No model.)

*To all whom it may concern:*

Be it known that I, RUSSELL ROBB, a citizen of the United States, and a resident of Boston, in the county of Suffolk and State of Massachusetts, have invented certain new and useful Methods of Electric Welding, of which the following is a specification.

My invention relates to that process of welding in which the parts or pieces to be welded are heated by an electric current of large volume passing from one to the other while they are pressed together; and the object of the invention is to secure a more uniform heating of the material to be welded over the whole surfaces or parts of the material involved in the joint which it is desired to form, thus producing a weld of greater homogeneity and more even texture than results when some of the parts reach a welding temperature before others.

A further object of my invention is to increase the heating at the joint, thus enlarging the capacity of any given apparatus to do large-sized work.

My invention consists in interposing between the parts or pieces to be welded a piece or pieces of conducting material which shall be first heated and softened by the passage of the electric current, and, by the pressure applied to the work, shall be caused to assume any irregularities in the surfaces of the pieces to be joined, thus establishing good contact over the whole of the parts to be welded. The piece or pieces thus interposed at the point where union is to be effected may be of the same material as the bars or other objects to be joined together or may be of different material, as desired. Such interposed piece or pieces are, however, preferably of the same material. The interposed piece or pieces are made of less conducting capacity than the parts which are to be joined, so that they will readily heat more rapidly and soften and adapt themselves to any irregularities. Such less conducting capacity might be obtained by using a material of less conductivity, or may be obtained by giving the interposed piece or pieces a less conducting area than the parts themselves at the point of welding. Preferably, the piece or pieces interposed are of the same general form as the surfaces of the parts to be united, but are of somewhat less area in cross-section.

In the accompanying drawings, Figure 1 is a plan showing two pieces of metal arranged in the clamps of a welding apparatus and abutting against an interposed piece of metal, such as shown in Fig. 2. Fig. 3 shows a modification in the form of the piece interposed between the bars or rods to be joined. Fig. 4 is a cross-section through sections of tubing with an interposed piece B of the form indicated in Fig. 5 in plan. Fig. 6 shows in perspective two square rods or pieces of metal, with a piece of metal B of the form best adapted to use with square work.

Referring to Fig. 1, A indicates two round bars or rods of iron, steel, or other metal located in the clamps of any welding apparatus or apparatus adapted to supply the current of large volume to such piece or pieces for passage from one to the other across the point where they are to be joined.

B is a piece of metal interposed between the rods A A and against which they abut, the piece being held between them by the usual pressure devices employed in electric welding operations. This piece, as shown in Fig. 2, is somewhat less in diameter than the rods or pieces A. I find that when the disk or piece B is a little less than half the diameter of the rods or pieces A, and in thickness is about one-tenth of its own diameter, good results are obtained. In the drawings, its thickness as compared with its diameter is exaggerated.

In applying the disk it is preferably held so that its center will coincide with the center of the bars or pieces between which it is held. A current of large volume being made to flow from one clamp to the other through the bars, the disk B will become heated first, owing to its being the part of highest resistance, and as it softens the mechanical pressure will cause it to assume any irregularities in the surface of the ends of A A and establish good contact at every point. This may take place before the bars themselves have become greatly affected, and the disk being at a high heat all over will be caused to spread uniformly on the ends of A, and will continue to spread as the current heats and softens the bars up to the welding-point. Force or pressure is then applied in the usual manner to produce a union between the bars.

When my invention is employed, it is not necessary to dress off the ends of the pieces to be united very exactly, as has heretofore been necessary in order that they may make exact contact over the whole of the parts or surfaces to be joined. This dressing off or truing of the ends of the pieces to be welded has been especially necessary, in order that good joints may be formed between sections of tubing. The form of the interposed piece may be varied considerably and yet good results be obtained.

Instead of a disk B, a spiral of small round wire, such as shown in Fig. 3, may be employed. The line of contact between the spiral wire and the bars or pieces to be united being very fine, the heat will be generated very rapidly and the softening and heating of the bars will extend uniformly over the whole surface.

In pipe-welding, as illustrated in Figs. 4 and 5, the interposed piece may be a piece of wire of a diameter of about half the thickness of the walls of the pipe, and may be bent into a ring which in diameter is the same as the mean diameter of the pipe.

When square pieces are employed, as in Fig. 6, the interposed piece is preferably square and has preferably about the same relative diameter and thickness as in the case of a plate used between two round bars or pieces.

My invention is of considerable utility in producing rapid heating at the point of union of large-sized pieces, since, as will be obvious, the resistance at the point of union is considerably greater than if the bars or pieces to be united were placed directly together.

What I claim as my invention is—

1. The herein-described improvement in electric welding, consisting in interposing a piece or pieces of fusible conducting material between the parts to be welded and applying pressure so as to cause the softened interposed material to assume any irregularities in the surfaces upon which it abuts.

2. The herein-described improvement in electric welding, consisting in interposing a piece or pieces of conducting material of the same nature as the parts themselves between the parts to be welded, and then passing an electric current from one part to the other through the said conducting material, so as to soften the same, and then squeezing the material, as and for the purpose described.

3. The herein-described improvement in electric welding, consisting in interposing between the parts to be welded a piece or pieces of conducting material of the same general form in cross-section as the said parts, but of less area, and then performing the electric welding operation.

4. The herein-described improvement in electric welding, consisting in abutting the parts to be welded against an interposed piece of conducting material of less conducting capacity than the parts themselves at the surfaces to be welded, and then squeezing such material between the parts after it has been softened by heat.

5. The herein-described improvement in electric welding, consisting in interposing a piece or pieces of conducting material of less conducting mass than the parts to be welded at the point of contact, passing an electric current through such material and then applying pressure, as and for the purpose described.

6. The herein-described improvement in electric welding, consisting in interposing between the parts to be welded a piece of fusible conducting material of less conducting area than the parts themselves at the point of welding, and heating the said piece by the electric current and applying pressure, as and for the purpose described.

Signed at McKeesport, in the county of Allegheny and State of Pennsylvania, this 3d day of April, A. D. 1890.

RUSSELL ROBB.

Witnesses:
A. BISTRUP,
CHAS. PATTERSON.